Nov. 3, 1970    A. KRESIN    3,537,730
QUICK FLEXIBLE HOSE AND/OR PIPE CONNECTION
Filed July 2, 1968    2 Sheets-Sheet 1
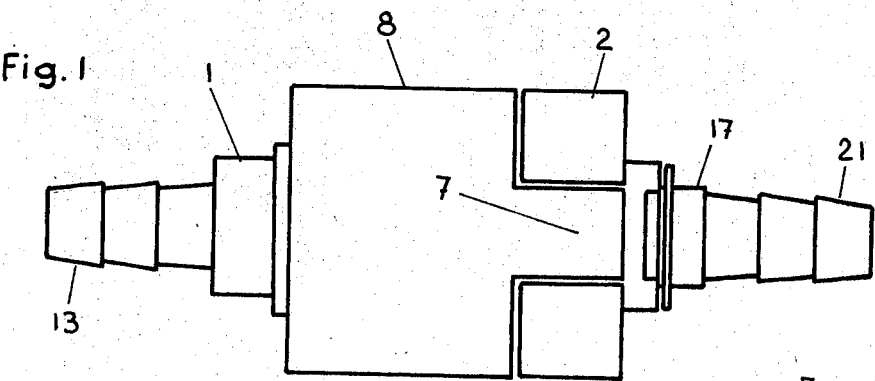
Fig. 1
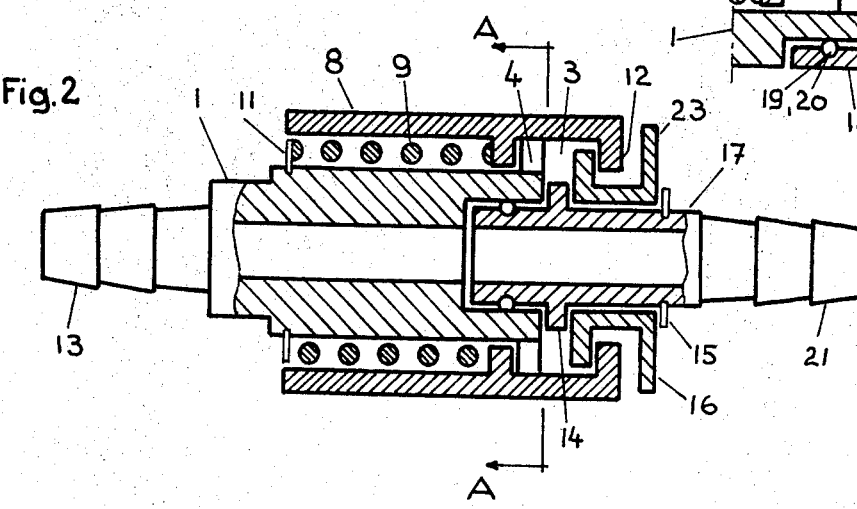
Fig. 4
Fig. 2
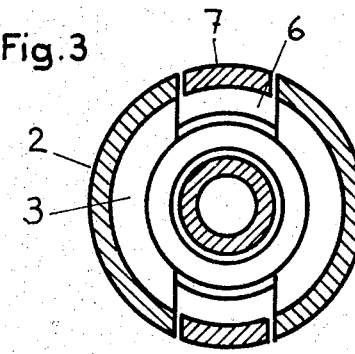
Fig. 3
section A-A
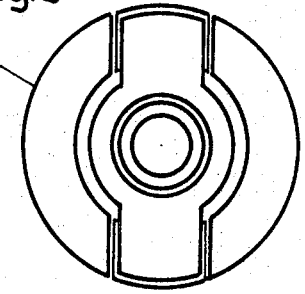
Fig. 5
view B
INVENTOR

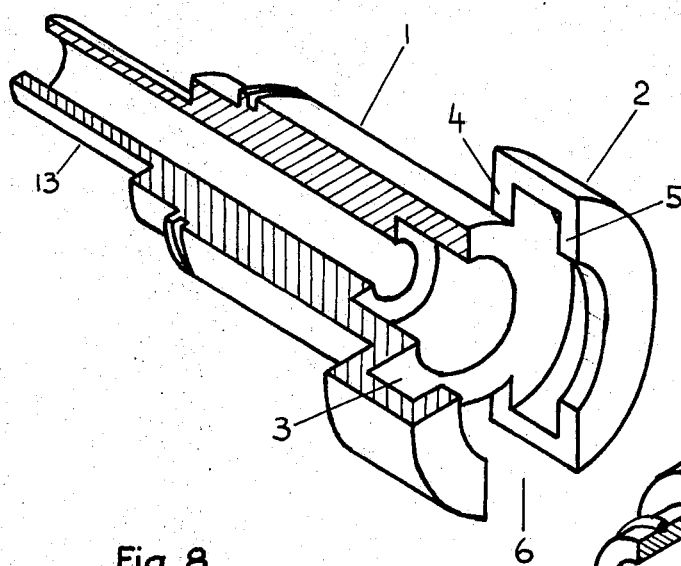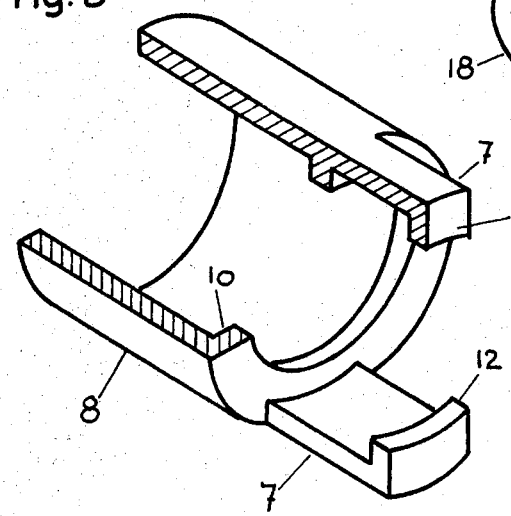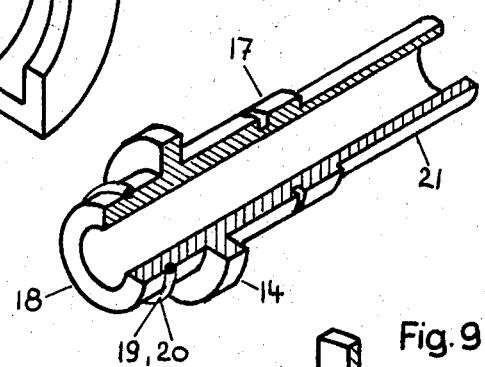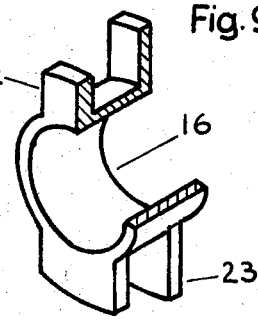

United States Patent Office 3,537,730
Patented Nov. 3, 1970

3,537,730
QUICK FLEXIBLE HOSE AND/OR PIPE CONNECTION
Adolf Kresin, Nachbarsweg 91,
Muhlheim (Ruhr) Germany
Filed July 2, 1968, Ser. No. 741,989
Claims priority, application Germany, Feb. 14, 1968,
1,284,751
Int. Cl. F16l 55/00
U.S. Cl. 285—86                               1 Claim

ABSTRACT OF THE DISCLOSURE

For connecting a pair of tubular male and female members, a coupling in combination provides an enlarged head portion at one end of the female member having an outer periphery and at least one axially spaced end portion, an internal annular recess-forming means and means defining at least one axially and radially extending slot communicating with the recess, the outer periphery and axial end portions of the head portion. The female member carries a locking sleeve having at least one lug positioned within and substantially filling the slot means and having inner annular recess defining means communicating with the recess in the head portion. Resilient means are mounted on the female member to urge the sleeve toward one end and cooperating means between the female member and sleeve limiting axial movement of the sleeve beyond the location where the recesses communicate. The male member has a slider means mounted thereon for rotatable movement only relative thereto. The slider means has at least one arcuate radially extending locking key fitting within the annular recess defined by the recesses in the head portion and lug whereby uncoupling occurs without relative rotation of the male and female members when the sleeve is moved against the resilient means to move the lug out of the slot means allowing the locking key to be withdrawn through the slot means when rotated into alignment therewith.

SUMMARY OF THE INVENTION

Tubular bodies are connected by a coupling having a pair of tubular members. In combination, this coupling includes one female member having an enlarged head portion at one end thereof, having outer periphery and at least one axially spaced end portion. The head portion has means defining an internal annular recess therein and means defining at least one axially and radially extending slot communicating with the recess, the outer periphery and axial end portions of said head. A locking sleeve is carried by the female member having at least one lug positioned within and substantially filling the slot means and having means defining an inner annular recess communicating with the recess in the head portion. Resilient means mounted on the female member urge the locking sleeve toward the one end and cooperating means between the female member and sleeve limit an axial movement of the sleeve beyond the location where the recesses communicate. The coupling combination further includes a male member provided with slider means mounted thereon for rotatable movement only relative thereto. The slider means is provided with at least one arcuate radially extending locking key fitting within the annular recess defined by the recesses in the head portion and lug whereby uncoupling occurs without relative rotation of the male and female members. The uncoupling occurs when the sleeve is moved against the resilient means thereby moving the lug out of the slot means to allow the locking key to be withdrawn through the slot means when rotated into alignment therewith.

This invention refers to a quick connection for flexible hoses and pipes, designed in such a way that flexible hoses or pipes connected with this coupling can be connected without rotation of the coupling members.

Besides the normally used screwed couplings, there are known some different systems of quick couplings. For example there is one coupling, where both parts are fixed by a U-shaped spring clamp. This spring clamp, placed for safety connection is an separated part and can be lost easily if elasticity flags. This injures the safety factor in operation, because in this case the hose coupling can disconnect itself. Another difficult point is, to connect or disconnect this coupling in areas of small space. It must be at least so much space, that the spring clamp can be taken off or can be placed. Normally, there is an additional tool required as screw driver etc. to take off the clamp.

There is a similar coupling commonly known, where the two parts of the coupling will be locked by a slight conical pin. This type has, compared with that above, an additional disadvantage, i.e. the pin can be loosened by vibration, pushes, shocks etc. How safe this connection is, depends upon how carefully it will be fixed. The quality of the connection depends on the quality of the fitter.

There is another well-known flexible hose coupling with only two parts (male and female), where the interlocking parts are attached to the female parts. These couplings will be locked by a set of spring loaded steel balls, which will be blocked or unblocked by a sleeve. This type of coupling is complicated, not easy to fabricate and therefore expensive.

Another known coupling with male and female members is equipped with lugs and notches for interlocking purposes as well as with a spring loaded sleeve. To lock the coupling, however, one hose attaching member of the coupling must be turned. For high pressure hoses, however, this will sometimes become difficult and for connecting pipes impossible. The design is somewhat complicated and production is expensive.

As example, another coupling well-known is provided with tongues and grooves, but they are pitched to a slight angle like a screw thread. To connect this coupling, one hose attaching member must be rotated rendering the disadvantages described above. In addition the coupling members can no more be rotated when being connected which will be important for use in some high pressure hydraulic equipment.

Furthermore are there some other flexible hose connections of cam and slot type construction, locked by rotary motion. All these types are either complicated and expensive or technical not satisfactory.

By the invention of this type of quick coupling all disadvantages and locks mentioned above will be avoided. It is of simple design, small dimensions, and guarantees absolutely safe locked connection up to the highest pressures. Easy and quick installation, also in areas with minimum space. With this coupling installed flexible hoses can be rotated without any limitations to the angle of rotation. But in addition for installation of pipe the coupling members can be connected without being rotated that means both coupling members can be welded onto the pipe, as an example.

The solution of this problem shall be discovered by providing a slider as a basic locker portion thus enabling to assemble and disassemble the coupling without rotating one of the coupling members and only turning the locker key.

The combination of a plug with a revolvable, but longitudinally fixed slider allows assembling and disassembly of the coupling members without any turning of the members. This is important for high pressure hoses being very stiff and for pipe connection normally movable in longitudinal pipe axis only.

The simple design of this coupling, renders production economical and involves minimum expenditure. No soldering braze or welding required.

For assembling the coupling the locker sleeve can be pushed back by the lock key passing the axial slot against the load of a coiled-wire spring, up to that point where the lock keys reach the circular groove of the locker body. By turning the slider the lock key moves into the circular groove leaving the axial slot. The spring pushes the locker sleeve into its projected position.

For disassembly the coupling, the locker sleeve will be pushed back by hand so that the projected tongues leaving the axial slot up to that point where the slider locker-key can be turned out of the circular groove into the axial slot of the locker body; now the coiled wire spring supports the disconnection of the coupling member by pulling out the plug.

In both cases it is important that no hose or pipe attaching member of the coupling has to be rotated.

For explaining this invention we attach the following drawings:

FIG. 1 is a side elevation of the improved coupling;

FIG. 2 is a longitudinal section with the hose attaching portion shown in elevation;

FIG. 3 is a cross-section A—A;

FIG. 4 is a view similar to that shown in FIG. 2 but in which the connection between the coupling members is not complete;

FIG. 5 is the view B;

FIGS. 6, 7, 8, 9 are showing the main parts of the coupling in a perspective section.

Male and female members shall preferably be applied. The female member 1 (body part) is provided with an enlarged head 2 having an internal annular groove 3 arranged between the shoulder 4 projecting from the periphery of the body part 1 and provided with a flange 5 projecting to the inside. The enlarged head 2 has an axial slot 6 leaving space for preferably two arcuated tongues 7 projecting from an axial movable locker sleeve 8 sliding on the body part 1. A spring 9 coiled about the body part 1 is interposed between the flange 10 projecting to the inside from the sleeve 8 and the abutment 11 which preferable will be a retainer washer fastened to the female member 1 thus, holding normally the locker sleeve 8 in its forwarded position. The end opposite of the enlarged head 2 is the hose or pipe attaching portion 13. The arcuated tongues 7 of the locker sleeve 8 having provided at its projected end flange sections 12 projecting to the inside fitting the axial slot 6, so that the annular groove 3 and the inwardly projected flange 5 of the female member 1 and the inwardly projected flange section 12 of the locker sleeve 8 form an complete annular ring groove.

The male member 17 of the coupling (the plug) is provided with a flange 14 projecting to the outside and the abutment 15 which will preferably be a retainer washer, are so installed that a slider 16 is unable to move in axial direction on the male member 17 but the slider 16 can be freely rotated between flange 14 and abutment 15. The slider 16 is a tube being on one end provided with lugs 22 projecting to the outside, which are able to pass through the axial slot 6 of the female member 1. These are the lock keys being inserted into the annular groove 3 as described later on. The other end is also equipped with lugs 23 projecting to the outside, enabling the slider 16 to be rotated for locking or unlocking.

The male member 17 of the coupling is provided with an enlarged head 18 having an external annular groove 19 with a seal 20 installed, preferably an O-ring type. The end of the male member 17 extends within the female member 1, so that the O-ring 20 seals the gap between the female and male member. The other end of the male member is the hose or pipe attaching portion 21.

When connecting the coupling members, the enlarged head 18 of the male member 17 will slide into female member 1 (body part), while the slider 16 will be rotated, so that the projecting lugs 22 of the slider 16 will force the locker sleeve 8 back against the load of spring 9 into position shown in FIG. 4, so that the slider 16 can be rotated thus bringing its lugs 22 behind the flange 5 of the body part 1. However, as soon as the lugs 22 are inserted into the annular groove 3 and with their full widths leaves the axial slot 6, the spring 9 will force the locker sleeve 8 forward to bring its flange section 12 again in line with the flange 5 of the female member 1. Special mention shall be made, that the female member 1 and the male member 17 need be moved in axial direction only, that the slider 16 has to be turned to move the projecting lugs 22 behind the flange 5 of the body part 1 and behind the flange 12 of the locker sleeve 8 so that a safe connection is established between the coupling members without turning any hose or pipe attaching part.

At the same time, however the coupling members are automatically locked against disengagement, since in any position the lock key 22 is either behind the flange 5 projecting to the inside or behind the flange section 12 of the locker sleeve 8 both providing a completely closed annular locking ring.

To disengage the coupling members, only the slider 16 has to be turned to bring the locker key 22 behind the inwardly projected flange 5. The locker sleeve 8 can then be withdrawn against the load of its spring 9 into the position shown in FIG. 4. By turning the slider 16 the lock key 22 is brought in opposite position to the axial slot 6 of the body part 1 and the male member 17 (the plug) can be withdrawn from its connected position.

It is obvious, that the details of structure may be varied without deviating from the principals of the invention.

What is claimed is:

1. A coupling for connecting tubular bodies comprising in combination: a pair of tubular members, one member being a female member provided with an enlarged head portion at one end thereof, having an outer periphery and at least one axially spaced end portion, said head portion having means defining an internal annular recess therein and means defining at least one axially and radially extending slot communicating with said recess, the outer periphery and axial end portions of said head portion; a locking sleeve carried by said female member having at least one lug positioned within and substantially filling said slot means and having means defining an inner annular recess communicating with said recess in said head portion; resilient means mounted on said female member urging said sleeve toward said one end and cooperating means between said female member and sleeve limiting axial movement of said sleeve beyond where said recesses communicate; and the other member being a male member provided with slider means mounted thereon for rotatable movement only relative thereto; said slider means provided with at least one arcuate radially extending locking key fitting within the annular recess defined by said recesses in said head portion and lug whereby uncoupling occurs without relative rotation of said male and female members when said sleeve is moved against said resilient means thereby moving said lug out of said slot means allowing said locking key to be withdrawn through said slot means when rotated into alignment therewith.

References Cited

UNITED STATES PATENTS

| | | | |
|---|---|---|---|
| 827,739 | 8/1906 | Lingenfelter | 285—277 X |
| 1,221,935 | 4/1917 | White | 285—86 |
| 1,341,135 | 5/1920 | Kennedy | 285—86 |
| 1,580,694 | 4/1926 | Smith | 285—86 X |

FOREIGN PATENTS 1,435,899 3/1966 France.

DAVE W. AROLA, Primary Examiner

U.S. Cl. X.R.

285—362